(12) United States Patent
Benda (10) Patent No.: US 8,416,531 B2
(45) Date of Patent: Apr. 9, 2013

(54) HEAD SUSPENSION LOAD BEAM WITH STIFFENING FEATURES

(75) Inventor: Steven J. Benda, Cokato, MN (US)

(73) Assignee: Benda Corporation, Cokato, MN (US)

( * ) Notice: Subject to any disclaimer, the term of this patent is extended or adjusted under 35 U.S.C. 154(b) by 0 days.

(21) Appl. No.: 13/069,687

(22) Filed: Mar. 23, 2011

(65) Prior Publication Data

US 2012/0069475 A1 Mar. 22, 2012

Related U.S. Application Data (60) Provisional application No. 61/340,815, filed on Mar. 23, 2010.

(51) Int. Cl.
*G11B 5/54* (2006.01)
(52) U.S. Cl.
USPC ....................................... 360/244.9
(58) Field of Classification Search ................ 360/244.9
See application file for complete search history.

(56) References Cited

U.S. PATENT DOCUMENTS

| | | | |
|---|---|---|---|
| 3,931,641 A | 1/1976 | Watrous | |
| 4,167,765 A | 9/1979 | Watrous | |
| 4,315,293 A | 2/1982 | Winkler | |
| 4,991,045 A | 2/1991 | Oberg | |
| 4,992,898 A | 2/1991 | Wanlass | |
| 5,027,240 A | 6/1991 | Zarouri | |
| 5,185,683 A | 2/1993 | Oberg | |
| 5,187,625 A | 2/1993 | Blaeser et al. | |
| 5,572,387 A | 11/1996 | Brooks et al. | |
| 5,654,851 A | 8/1997 | Tucker et al. | |
| 5,796,554 A | 8/1998 | Berding et al. | |
| 5,850,319 A | 12/1998 | Tangren | |
| 5,936,803 A * | 8/1999 | Berding | 360/244.8 |
| 7,352,533 B1 * | 4/2008 | Bjorstrom | 360/244 |
| 7,486,481 B2 * | 2/2009 | Kashima | 360/244.9 |
| 7,773,344 B1 * | 8/2010 | Young | 360/244.9 |
| 7,952,836 B1 * | 5/2011 | Berscheit et al. | 360/244.9 |
| 8,120,878 B1 * | 2/2012 | Drape et al. | 360/244.9 |
| 2002/0141114 A1 * | 10/2002 | Wittig et al. | 360/244.9 |

(Continued)

FOREIGN PATENT DOCUMENTS

| JP | 8263172 A | 10/1996 |
|---|---|---|
| WO | 2005042182 A1 | 5/2005 |

OTHER PUBLICATIONS

International Search Report and Written Opinion, dated Jun. 20, 2011 for PCT Application No. PCT/US2011/029526, 12 pages.

*Primary Examiner* — Mark Blouin
(74) *Attorney, Agent, or Firm* — Fredrikson & Byron, PA (57) ABSTRACT

Embodiments provide head suspension load beams formed from a sheet of material with one or more stiffening members molded on the sheet. In some cases the sheet material includes an out-of-plane portion extending out at a nonzero angle, and the stiffening member includes a rib formed on the sheet material about the out-of-plane portion of the sheet material. In some cases a void extending through the sheet material connects portions of a stiffening member on opposite surfaces of the sheet material. Ribs of stiffening material may also provide flow pathways for directing moldable material to portions of the sheet, such as for forming a rib about the sheet edge. A method of making a load beam includes placing a sheet material within an injection mold and bending a portion of the sheet material during the molding process.

28 Claims, 9 Drawing Sheets

U.S. PATENT DOCUMENTS

2003/0202287 A1 10/2003 Smith
2006/0227463 A1* 10/2006 Wright et al. .............. 360/244.2
2007/0291414 A1* 12/2007 Zeng et al. ................ 360/244.2
2008/0024928 A1 1/2008 Yang

* cited by examiner

HEAD SUSPENSION LOAD BEAM WITH STIFFENING FEATURES

CROSS-REFERENCES

This application claims the benefit of U.S. Provisional Application No. 61/340,815, filed Mar. 23, 2010, the content of which is hereby incorporated by reference in its entirety.

FIELD

This disclosure generally relates to head suspension assemblies used in data disk drives to support a transducer head next to a disk for retrieving and/or storing digital data.

BACKGROUND

One form of a data storage device for storing and retrieving digital data is a data disk drive. A data disk drive typically accesses digital data on an integral storage disk (e.g., in the case of a computer hard drive), or alternatively, may access data on a removable storage disk (e.g., in the case of a CD or DVD drive). A transducer head is used to read and/or write the data on the disk. The transducer head is typically supported by a head suspension assembly, which is coupled to an actuator mechanism that positions the head at specific locations on the disk. Head suspension assemblies are also used to properly align and orient a transducer head relative to the disk surface to ensure successful data transfer.

During use, a head suspension assembly sometimes exhibits undesirable bending and twisting, which can cause the transducer head to deviate from its desired position relative to the disk. Accordingly, head suspension assemblies are commonly designed to reduce such unwanted movement. In particular, efforts have focused on increasing the lateral stiffness and torsional stiffness of a head suspension assembly by changing the material and/or shape of the assembly load beam or by reinforcing the load beam with a separate stiffening component. Stainless steel and other metals are commonly used for head suspension assemblies, as well as plastics or polymer components.

Despite advances to date, there remains a continuing need for head suspension assemblies with load beams exhibiting less lateral and torsional movement.

SUMMARY

Embodiments of the invention generally relate to stiffening a load beam for a head suspension assembly. According to one aspect of the invention, a load beam is provided for a head suspension assembly within a digital data disk drive. The load beam is formed from a sheet material and has a stiffening member formed on the sheet material. The sheet material is adapted to extend between an actuator mounting portion of the head suspension assembly and a flexure mounting section of the head suspension assembly. The sheet material also includes a first surface, a second surface, and an out-of-plane portion extending out from the first surface of the sheet material at a nonzero angle. The stiffening member includes a rib formed on the sheet material about the out-of-plane portion of the sheet material. The stiffening member is formed from a molded material.

According to another aspect of the invention, another load beam is provided for a head suspension assembly within a digital data disk drive. The load beam is formed from a sheet material adapted to extend between an actuator mounting portion of the head suspension assembly and a flexure mounting section of the head suspension assembly. The sheet material also includes a first surface, a second surface, and a void extending through the sheet material between the first surface and the second surface. The load beam also includes a stiffening member, which has a first portion formed on the first surface of the sheet material and a second portion formed on the second surface of the sheet material. The first and the second portions of the stiffening member are joined through the void. The stiffening member also includes a third portion joined to the second portion. The third portion includes a rib formed about an edge of the sheet material. Each of the first, second, and third portions of the stiffening member are formed from a molded material.

According to another aspect of the invention, another load beam is provided for a head suspension assembly within a digital data disk drive. The load beam is formed from a metal sheet that is adapted to extend out from an actuator mounting portion of the head suspension assembly. The metal sheet includes a first surface, a second surface, and a void extending through the metal sheet between the first surface and the second surface. The load beam also includes a load bearing dimple formed on the first surface of the metal sheet proximate the void and a dimple attachment member formed on the second surface of the metal sheet and joined to the load bearing dimple through the void. The load bearing dimple and the dimple attachment member are formed from a molded polymeric material.

According to another aspect of the invention, a method is provided for making a load beam for a head suspension assembly within a digital data disk drive. The method includes providing a sheet material that is adapted to extend between an actuator mounting portion of the head suspension assembly and a flexure mounting section of the head suspension assembly. The sheet material includes opposite first and second surfaces. The method also includes placing the sheet material within a mold, such as a polymeric material injection mold. The method further includes bending a portion of the sheet material out-of-plane with respect to the first surface of the sheet material and injecting a polymeric material into the mold to form a stiffening member on the sheet material. The stiffening member includes a rib formed about the out-of-plane portion of the sheet material.

These and various other features and advantages will be apparent from a reading of the following detailed description.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
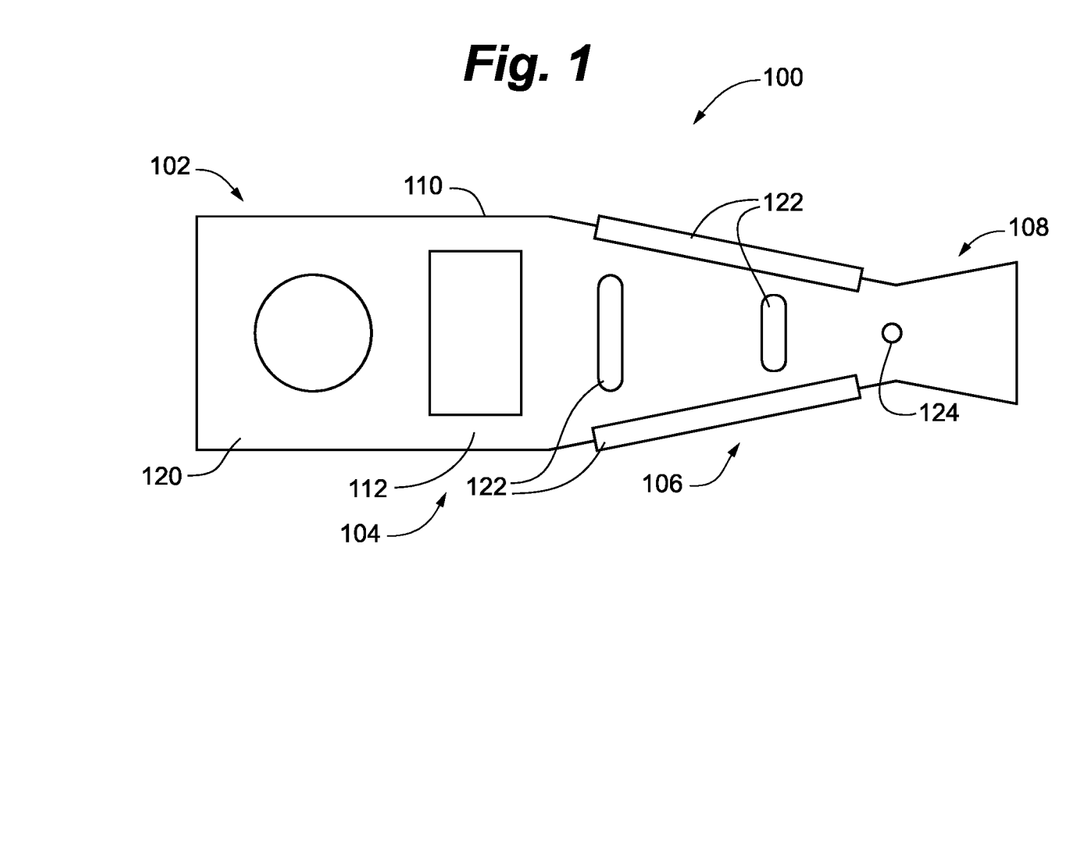
FIG. 1 is a top schematic view of a load beam in accordance with an embodiment of the invention.

FIG. 1 is a top schematic view of a load beam 100 in accordance with an embodiment of the invention. The load beam 100 is one part of a head suspension assembly that can be used within a digital data disk drive to support a transducer head with respect to a data storage disk. For example, the load beam 100 could be incorporated in a disk drive such as a computer hard disk drive, a floppy disk drive, a CD drive, a DVD drive, and many other types of disk drives. In this example, the load beam 100 generally includes a number of integrally formed sections, including an actuator mounting portion 102, a spring section 104, an intermediate portion 106, and a flexure mounting portion 108. In certain embodiments, one or more of these sections may be formed separately and attached together with suitable fasteners such as adhesives, rivets, welds, and/or other fasteners.

In addition to the load beam 100, a head suspension assembly will also typically include structure such as a base plate and a collar (not shown) proximate the actuator mounting portion 102 for mounting the load beam to a disk drive actuator. A typical head suspension assembly also includes a flexure element (not shown) connected (integrally or attached) to the load beam flexure mounting portion 108. The flexure element supports a head slider with a read and/or write head. Additional aspects of head suspension assemblies will be well known to those skilled in the art and are omitted here. U.S. Pat. Nos. 4,991,045 and 7,352,533 provide examples of many known aspects of head suspension assemblies and are both incorporated herein by reference in their entirety.

In some cases, the term "load beam" is used herein to refer to at least part of the entire structure shown in FIG. 1. For example, the intermediate section 106 of the load beam 100 extends between the actuator mounting/spring portions 102, 104 and the flexure mounting portion 108, and thus supports the load of the flexure mounting portion 108 out away from the disk drive actuator mount. As used herein, in some embodiments the term "load beam" may be used to refer to the intermediate section 106, which may or may not be initially provided with the actuator mounting portion 102, the spring portion 104, and/or the flexure mounting portion 108.

According to some embodiments, the base structure of the load beam 100 is formed from a sheet material 120. The sheet material 120 can be any suitable material. In some cases the sheet material is a metal or metal alloy. For example, the load beam 100 can in some cases be formed from one or more sheets of stainless steel. A metal or metal alloy sheet can in some cases provide specific portions of the load beam with a desired amount of flexibility. In this case the spring section 104 of the load beam 100 includes two spring arms 110, 112 that provide a spring force (sometimes called a "gram load") to urge a head slider towards the storage disk (not shown). The sheet material 120 will typically have a generally uniform thickness, which may be selected based upon the strength and stiffness characteristics desired for the sheet material. In one case the sheet material is about 0.03 mm thick, though other thicknesses are also possible.

According to some embodiments of the invention, portions of the load beam 100 include one or more stiffening members 122, which serve to strengthen the sheet material 120 and/or limit undesired bending and torsional movement of the load beam 100 during use within a disk drive. FIG. 1 shows some possible locations for stiffening members 122, though it is contemplated that stiffening members 122 may be located at any location, angle, and/or orientation upon the sheet material 120 in order to provide a desired stiffening effect. In some cases a stiffening member 122 is formed as a rib that extends for a length along a surface and/or edge of the sheet material 120. The stiffening members 122 are preferably formed from a moldable material, such as a polymeric material. Thus, in some cases the stiffening members 122 can be formed on the sheet material 120 with an injection molding process.

Incorporating one or more stiffening members 122 into the intermediate portion 106 of the load beam 100 (or elsewhere) provides the load beam with enhanced lateral and torsional stiffness, which may increase the load beam's resonant frequencies and/or reduce the likelihood of unwanted bending and torsional movement of the load beam. In some embodiments one or more stiffening members are configured to provide enhanced stiffness while occupying a reduced footprint upon the sheet material, especially when compared with conventional stiffening methods. For example, forming stiffening members 122 as elongated ribs of a rigid material can provide directional stiffness in the load beam without the need for a rigid substrate underlying all or most of the sheet material 120. The targeted use of stiffening members 122 placed strategically about the intermediate portion 106 of the load beam can also provide desired lateral and torsional stiffness without the need to completely encase the entire load beam with a stiffening material. Thus some embodiments of the invention can provide enhanced stiffness with a reduced amount of stiffening material, which also reduces material costs and reduces the overall mass added to the load beam.

As will be discussed further herein, in some embodiments one or more of the stiffening members 122 may be reinforced. In some cases this stiffening member reinforcement is also referred to herein as a "double beam" configuration because it involves the combined stiffening effect of multiple stiffening members and/or out-of-plane portions of the sheet material 120. Although not shown in FIG. 1, in some cases a portion of the sheet material 120 may be bent out-of-plane. A molded material formed about the out-of-plane portion forms a stiffening member that combines the stiffening effect of the rigid molded material and the stiffening effect of the out-of-plane portion of the sheet material. In certain embodiments a "double beam" effect may be provided by a stiffening member having a first rib portion on one surface of the sheet material and a second rib portion on the second surface of the sheet material.

In some embodiments the load beam includes a load bearing dimple 124, which engages a corresponding structure on a flexure element (not shown). The flexure element permits pitch and roll movements of a slider head to follow disk surface fluctuations as the storage disk rotates and the head suspension assembly moves the head across the disk. The flexure element typically includes a cantilevered portion that is biased against the load bearing dimple 124 to allow the slider head to freely pitch and rotate about the load bearing dimple. According to some embodiments the load bearing dimple 124 is formed on the surface of the sheet material 120 from a molded polymeric material. As will be discussed further herein, in some embodiments further stiffening measures can be added to the load bearing dimple 124 to enhance the stiffness of the load beam proximate to the load bearing dimple 124.

Figure 2A:
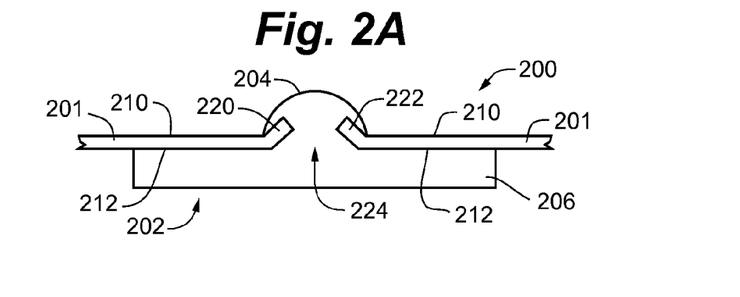
FIG. 2A is a partial cross-sectional view of a load beam with a stiffening member in accordance with an embodiment of the invention.
Figure 2B:
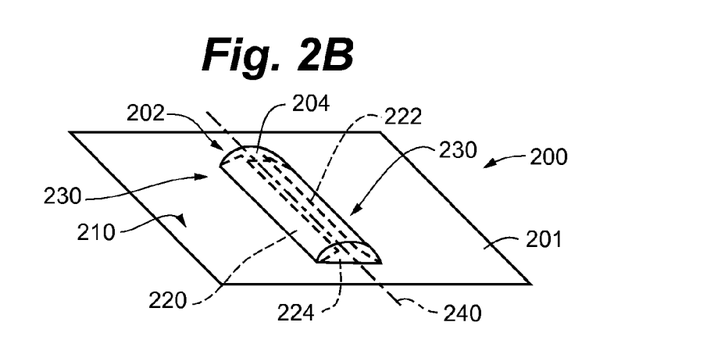
FIG. 2B is a partial perspective view of the load beam of FIG. 2A.

FIG. 2A is a partial cross-sectional view of a load beam 200 generally including a sheet material 201 with a stiffening member 202 in accordance with an embodiment of the invention. FIG. 2B is a partial perspective view of the load beam 200. The stiffening member 202 is formed from a moldable material positioned upon the sheet material 201. In this case the stiffening member 202 includes a rib 204 attached to a first surface 210 of the sheet material, and a second portion 206 attached to a second surface 212 of the sheet material opposite the first surface 210. As shown in FIGS. 2A and 2B, the sheet material 201 includes a first out-of-plane portion 220 and a second out-of-plane portion 222. The out-of-plane portions 220, 222 are sections of the sheet material partially separated from the surrounding material and bent out-of-plane with respect to one or both surfaces of the sheet material 201 at a non-zero angle. In this example the rib 204 is formed about each of the out-of-plane portions 220, 222.

The sheet member 201 defines a void 224 at the location of the first and second out-of-plane portions 220, 222. The rib 204 is formed about the first and second out-of-plane portions 220, 222 and is joined to the second portion 206 of the stiffening member through the void 224, which also secures the stiffening member 202 to the sheet material 201 in some embodiments. In this case, the formation of the stiffening member about the out-of-plane portions combines the stiffening effects of the rib 204, the first out-of-plane portion 220, the second out-of-plane portion 222, and the second portion 206 of the stiffening member. Accordingly, the combined stiffening effect creates an enhanced part stiffness factor along a major flex axis 240 that can increase the rigidity of the load beam 200 in a particular location on the sheet material and in a desired direction.

As discussed above, the material sheet 201 of the load beam 200 can be formed from a material having sufficient strength and flexibility, such as a metal or metal alloy such as stainless steel. The stiffening member 202 can be formed from any desirable moldable material. In certain embodiments the moldable material is a moldable polymeric material adapted for injection molding techniques. In some embodiments the moldable material is a thermoplastic. In some cases the stiffening member 202 is molded from polystyrene, or other polymers, including carbon-filled polycarbonate. Of course the stiffening member 202 can be molded from a wide variety of moldable polymeric materials, and applications of the invention are not restricted to any particular material.

In some embodiments the targeted application of the stiffening effect is illustrated by the stiffening member having a contained footprint upon the sheet material. For example, for the load beam 200 shown in FIGS. 2A and 2B, the rib 204 is formed on the first surface 210 of the sheet material 201 and the portion 230 of the first surface 210 of the sheet material surrounding the rib 204 is free from the molded material. In certain embodiments at least a portion of the first surface 210 of the sheet material 201 adjacent the rib 204 is free from the molded material, which may extend to one or more edges of the sheet material. In some cases at least a portion of the second surface 212 of the sheet material adjacent the second portion 206 of the stiffening member is also free from the molded material. In some cases the entire portion of the second surface 212 surrounding the second portion 206 of the sheet material 201 is free from the molded material. Accordingly, the stiffening member 202 can be formed on the sheet material 201 without necessarily extending to some and/or all of the edges of the sheet material, which allows for a smaller footprint and less material usage.

As shown in FIGS. 2A and 2B, the rib 204 of the stiffening portion is formed about and completely encases the first and the second out-of-plane portions 220, 222 of the sheet material 201. Complete encasement is not a required feature, though, and in certain embodiments one or more parts of the out-of-plane portions may extend through the rib 204. As depicted, in some cases the rib 204 may be molded with a domed cross-sectional profile, although other profiles (e.g., rectangular) are also contemplated. In certain embodiments a rib is considered a generally longitudinal element, with a length greater than its width and height. Of course multiple rib dimensions are contemplated and embodiments of the invention are not restricted to any particular length requirements. The length, width, and bend angle for each of the out-of-plane portions 220, 222 and the dimensions of the void 224 can be varied to fit the desired stiffness characteristics and sheet material dimensions for particular cases. In addition, the dimensions of the rib 204 and the second portion 206 of the stiffening member can be modified to further achieve a satisfactory stiffness effect in combination with each other and the out-of-plane portions 220, 222.

In addition, the rib 204 can be formed upon the sheet material 201 in any desirable orientation or angle with respect to, e.g., a length of the load beam 200. For example, in some cases a rib is a length of molded material that extends substantially parallel to the length of the sheet material or load beam, or substantially perpendicular to the length of the load beam (e.g., see FIG. 1). In certain cases the major axis 240 of the rib may be formed at an angle with respect to a length or width of the load beam. It is also contemplated that two or more ribs may be oriented upon the sheet material to intersect each other.

The position of the rib 204 relative to the edges of the sheet material 201 (shown in part in FIGS. 2A, 2B) may also be varied to suit particular stiffening needs. In the example shown in FIGS. 2A and 2B, the sheet material 201 generally defines a perimeter and the out-of-plane portions are partially separated sections of the sheet material bent out-of-plane to form the void 224 in the sheet material within the perimeter edges of the sheet material. As will be discussed in more detail, certain embodiments provide one or more ribs formed about out-of-plane portion(s) that are adjacent to an edge of the sheet material, such that the "void" created by the out-of-plane portion is open to the edge of the sheet material.

Of course, the embodiment shown in FIGS. 2A and 2B is just one example of a load beam with a stiffening member in accordance with embodiments of the invention. Additional embodiments of the invention can provide load beams with one, two or any number of stiffening features. In addition, in some cases a stiffening member includes a rib that is formed about just one out-of-plane portion. A rib may also be formed about two out-of-plane portions (as in FIGS. 2A, 2B) or three or more out-of-plane portions.

Figure 3A:
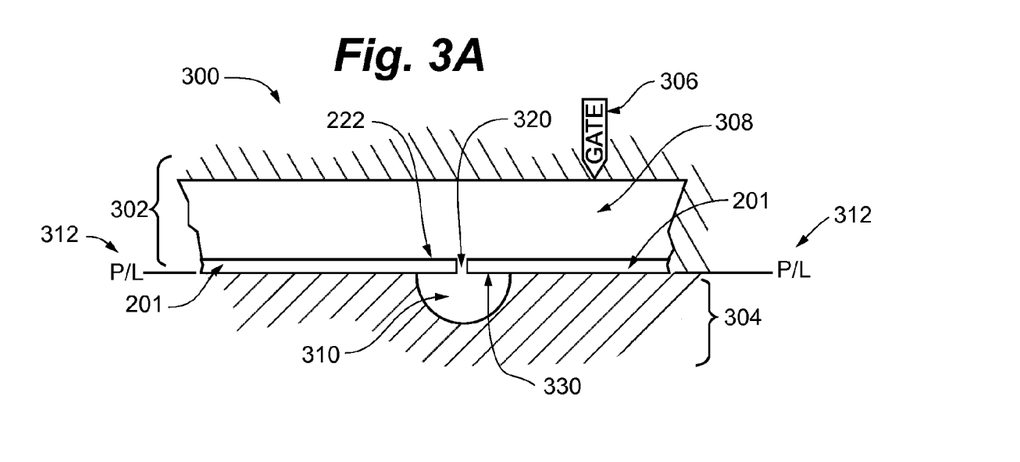
FIG. 3A is a partial cross-sectional view of a mold for forming the stiffening member of FIG. 2A on a sheet material in accordance with an embodiment of the invention.
Figure 3B:
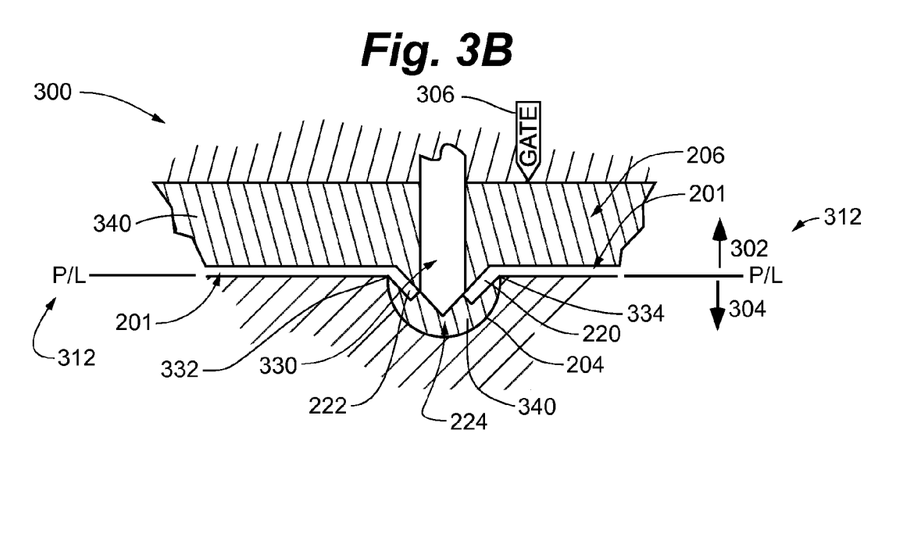
FIG. 3B is a partial cross-sectional view of the mold of FIG. 3A with a moldable material injected in accordance with an embodiment of the invention.
Figure 3C:
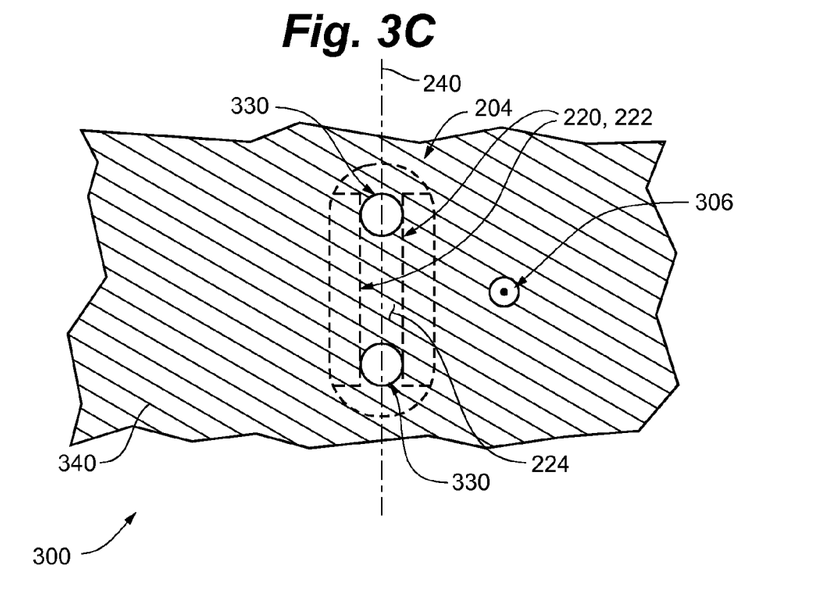
FIG. 3C is a partial top view of the mold of FIG. 3A with a moldable material injected in accordance with an embodiment of the invention.

According to some embodiments, an out-of-plane portion of a load beam can be formed in a conventional manner. For example, one or more flanges, tabs, edges, or other portions may be cut out and bent to an appropriate degree during the process of stamping, milling, etching, etc. the sheet material forming the base for the load beam. Turning now to FIGS. 3A-3C, some embodiments of the invention provide novel methods of forming a load beam including one or more out-of-plane portions. FIG. 3A is a partial cross-sectional view of a mold 300 for forming the stiffening member of FIGS. 2A and 2B on a sheet material in accordance with an embodiment of the invention. FIG. 3B is a partial cross-sectional view of the mold of FIG. 3A with a moldable material injected in accordance with an embodiment of the invention. FIG. 3C is a partial top view of the mold of FIG. 3A with a moldable material injected in accordance with an embodiment of the invention.

In certain embodiments, a method of injection molding can be used to form the load beam 200. Referring to FIG. 3A, in some cases an insert mold 300 is provided that includes a first side 302, a second side 304, and a material gate 306. The first side 302 defines a cavity 308 for forming the second portion 206 of the stiffening member, while the second side 304 defines a mold cavity 310 for forming the rib 204. The sheet material 201 is provided for the molding process in a substantially smooth and planar configuration, without the out-of-plane portions 220, 222 formed as of yet. In certain embodiments the sheet material may include one or more slots or outlines 320 (created by etching, milling, etc.) that define the partially separated perimeters of the portions of the sheet material 201 to be bent. The sheet material 201 is then placed onto the face of the mold 300 (e.g., either of the first or second sides) and the mold is closed about its parting line 312.

Referring to FIGS. 3B and 3C, in certain embodiments a mold includes one or more push bars for bending portion(s) of the sheet material out-of-plane. As the push bars engage the sheet material, the portions of the sheet material bend about counterpoints in the mold. In this example, the mold 300 includes two push bars 330 that engage the portions of the sheet material to be bent. As the push bars 330 move down, the portions 220, 222 of the sheet material bend about two respective counterpoints 332, 334 at the edge of the mold cavity 310 in the second side 304 of the mold. In certain embodiments, the push bars 330 are integrally formed with or attached to the mold 300 and can be advanced against the sheet material 201 as the first and the second sides 302, 304 of the mold are closed. In some embodiments, the push bars 330 may move relative to the mold with hydraulics, pneumatics, and/or another mechanical system advancing the push bars 330 after the mold 300 is closed. The shape, size, and other dimensions of the push bars 330 may vary as long as they effectively bend the portions of the sheet material out-of-plane to the desired degree. In the illustrated example, the push bars 330 are formed as rods with the ends beveled to more easily enter the slot 320 and smoothly and continuously engage the portions 220, 222 of the sheet material as they are bent. Of course other geometries (including less efficient forms) may also be used for the ends of the push bars.

After advancing the push bars 330 to bend the portions 220, 222 of the sheet material out-of-plane, the molding process includes injecting a moldable (e.g., polymeric) material 340 into the mold 300 through the material gate 306. The push bars 330 may remain in place during material injection (as is illustrated in FIGS. 3B-3C), or may alternatively be retracted prior to material injection if the mold provides retractable push bars. The material flows through the cavities 308, 310 and the void 224 in the sheet material to form the stiffening member 202 having the rib 204 and the second portion 206 of the stiffening member formed on the sheet material 201. After the moldable material 340 solidifies, the mold sides 302, 304 can be opened to remove the now-molded load beam 200. In some cases where the push bars 330 remain in place during material injection, the push bars may leave recesses in the solidified moldable material upon withdrawing them after material solidification.

Accordingly, it should be appreciated that the process illustrated in FIGS. 3A-3C can be used to bend the portions 220, 222 of the sheet material out-of-plane after placing the sheet material 201 within the mold 300. Incorporating the bending into the injection molding process can thus save time and expense in manufacturing the sheet material. In certain embodiments, one, two or many portions of a sheet material can be bent out-of-plane in this manner. Of course much more can be discussed about the injection molding process, but it should be appreciated that injection molding is a well-known art and many of these details are omitted here as they will be known to those skilled in the art.

Figure 4:
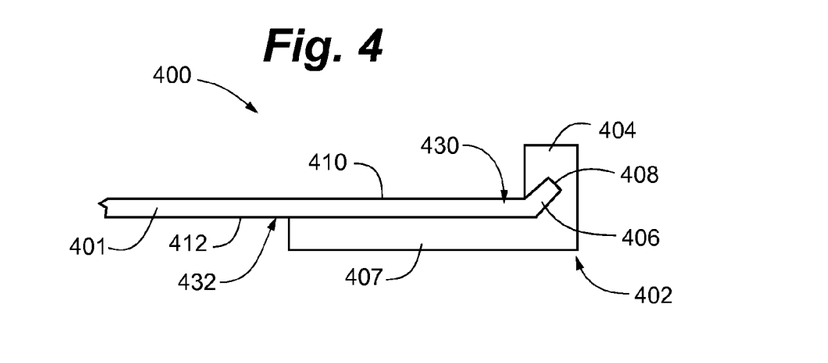
FIG. 4 is a partial cross-sectional view of a load beam with a stiffening member in accordance with an embodiment of the invention.

FIG. 4 is a partial cross-sectional view of a load beam 400 with a stiffening member 402 in accordance with an embodiment of the invention. In this embodiment, the load beam 400 includes a sheet material 401 having an out-of-plane portion 406 positioned at an edge 408 of the sheet material. The stiffening member 402 is formed from a moldable material positioned upon the sheet material 401. In this case the stiffening member 402 includes a rib 404 attached about the edge 408 of the sheet material, in contact with both the first and the second surfaces 410, 412 of the sheet material. The stiffening member 402 also includes a second portion 407 attached to the second surface 412 of the sheet material.

The out-of-plane portion 406 may be partially separated from the surrounding material creating a "void" that is open to the edge 408 of the sheet material. Alternatively, the out-ofplane portion 406 may include an entire edge of the load beam 400. The out-of-plane portion 406 is bent out-of-plane with respect to the surfaces of the sheet material 401 at a non-zero angle. In this example the rib 404 is formed about the out-of-plane portion 406, completely encasing the out-of-plane edge (though this is not required), which also secures the stiffening member 402 to the sheet material 401 in some embodiments. In this case, the formation of the stiffening member about the out-of-plane edge 408 combines the stiffening effects of the rib 404, the out-of-plane portion 406, and the second portion 407 of the stiffening member. Accordingly, the combined stiffening effect creates an enhanced part stiffness factor along the length of the rib 404 that can increase the rigidity of the load beam 400 along its edge 408.

As illustrated in FIG. 4, the targeted application of the stiffening effect is illustrated by the stiffening member 402 having a contained footprint upon the sheet material 401. For example, the rib 404 is formed on the first surface 410 of the sheet material 401 and at least a portion 430 of the first surface 410 of the sheet material adjacent the rib 404 is free from the molded material, which extends to the one edge 408 of the sheet material 401. In addition, at least a portion 432 of the second surface 412 of the sheet material adjacent the second portion 407 of the stiffening member is also free from the molded material.

Figure 5A:
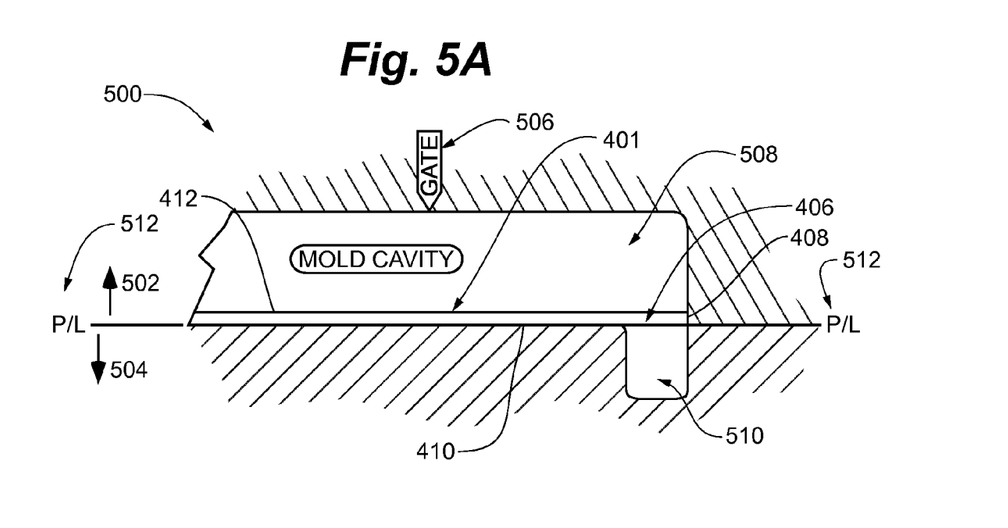
FIG. 5A is a partial cross-sectional view of a mold for forming the stiffening member of FIG. 4 on a sheet material in accordance with an embodiment of the invention.
Figure 5B:
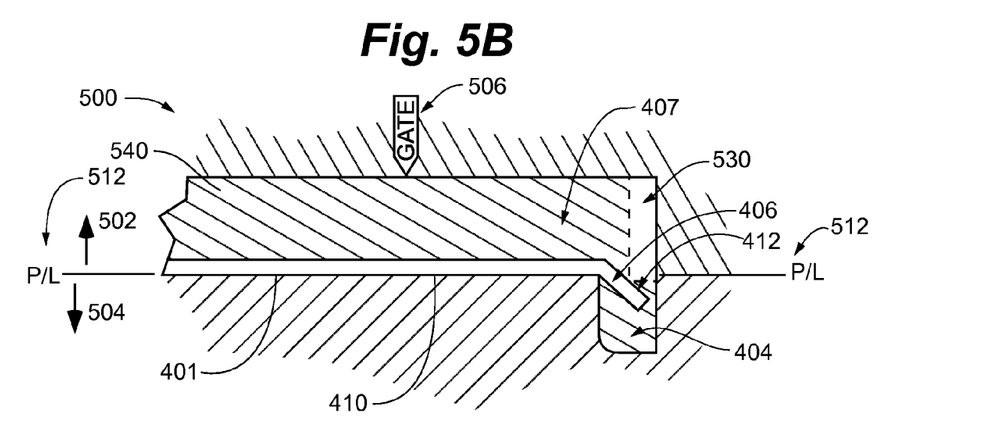
FIG. 5B is a partial cross-sectional view of the mold of FIG. 5A with a moldable material injected in accordance with an embodiment of the invention.
Figure 5C:
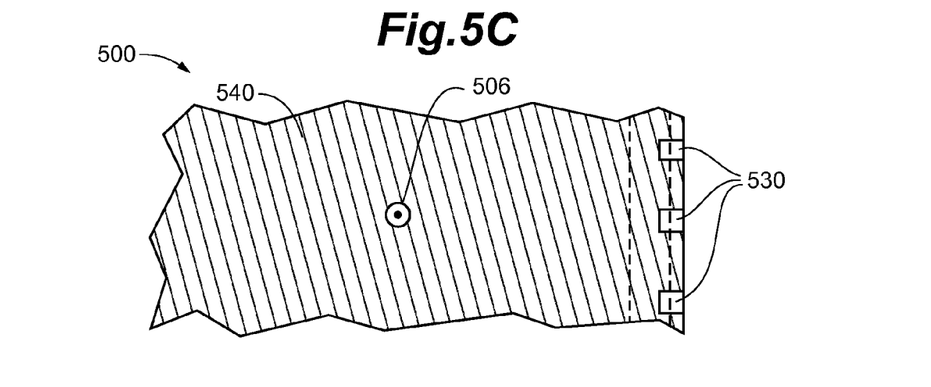
FIG. 5C is a partial top view of the mold of FIG. 5A with a moldable material injected in accordance with an embodiment of the invention.

In certain embodiments of the invention, the out-of-plane portion 406 is formed in a conventional manner, e.g., during the process of stamping, milling, etching, etc. the sheet material forming the base for the load beam 400. Turning to FIGS. 5A-5C, some embodiments provide a method of forming the load beam 400 that includes integrally forming the out-of-plane portion 406 during an injection molding process. FIG. 5A is a partial cross-sectional view of a mold 500 for forming the stiffening member 402 of FIG. 4 on the sheet material 401 in accordance with an embodiment of the invention. FIG. 5B is a partial cross-sectional view, and FIG. 5C is a partial top view, of the mold 500 with a moldable material 540 injected in the mold 500.

The method of forming the load beam 400 illustrated in FIGS. 5A-5C resembles the method illustrated in FIGS. 4A-4C in certain aspects. The mold 500 is provided, the sheet material 401 is placed onto the face of the mold 500, and the mold is closed about its parting line 512. The mold 500 includes a first side 502, a second side 504, and a material gate 506. The first side 502 defines a cavity 508 for forming the second portion 407 of the stiffening member, while the second side 504 defines a mold cavity 510 for forming the rib 404. The sheet material 401 is provided for the molding process in a substantially smooth and planar configuration, without the out-of-plane portion 406 yet formed. In some cases the sheet material may include one or more slots or outlines (not shown) that define a partially separated perimeter of a tab or flange to be bent at the edge 408 of the sheet material.

Referring to FIGS. 5B and 5C, the mold 500 includes at least three push bars 530 that engage the portion 406 of the sheet material to be bent. As the push bars 530 move down, the portion 406 of the sheet material bends about a counterpoint 532 at the edge of the mold cavity 510 in the second side 504 of the mold. As described above with respect to FIGS. 3B-3C, the push bars 530 may be integrally formed with or attached to the mold 500 or may move relative to the mold with the assistance of a mechanical system. In the illustrated example, the push bars 530 are formed as bars with a square cross-section.

After advancing the push bars 530 to bend the portion 406 of the sheet material out-of-plane, the molding process includes injecting a moldable (e.g., polymeric) material 540 into the mold 500 through the material gate 506. The push bars 530 may remain in place during material injection, or may alternatively be retracted prior to material injection if the mold provides retractable push bars. The material flows through the cavities 508, 510 and about the edge 408 of the sheet to form the stiffening member 402. Accordingly, it should be appreciated that the process illustrated in FIGS. 5A-5C can be used to bend the portion 406 of the sheet material out-of-plane after placing the sheet material 401 within the mold 500.

Figure 6A:
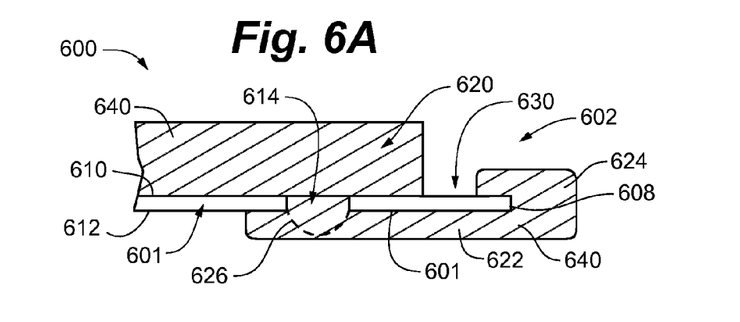
FIG. 6A is a partial cross-sectional view of a load beam with a stiffening member in accordance with an embodiment of the invention.
Figure 6B:
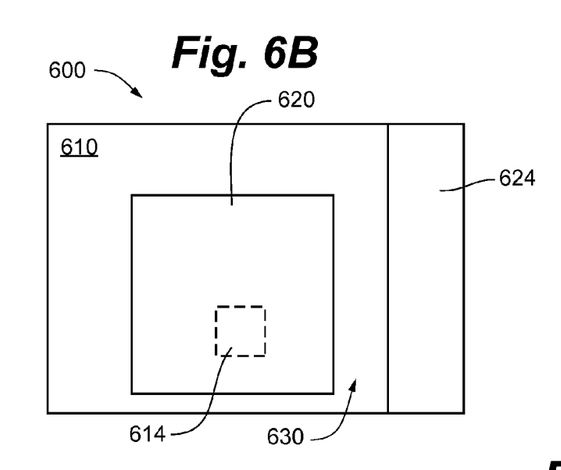
FIG. 6B is a partial top view of the load beam of FIG. 6A.
Figure 6C:
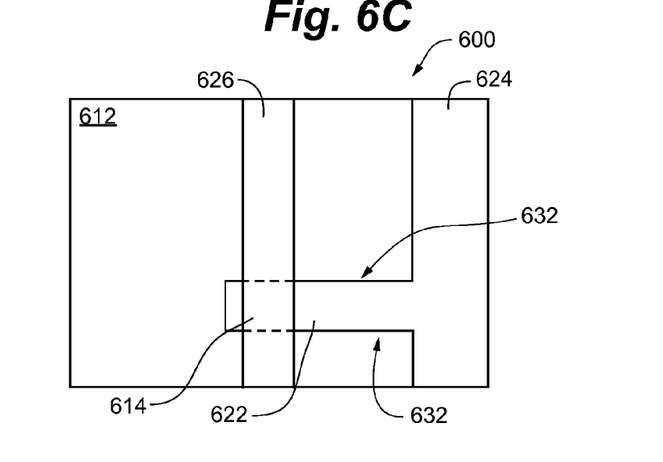
FIG. 6C is a partial bottom view of the load beam of FIG. 6A.

FIG. 6A is a partial cross-sectional view of a load beam 600 with a stiffening member 602 in accordance with an embodiment of the invention. FIGS. 6B and 6C provide partial top and bottom views, respectively, of the load beam 600. In this embodiment, the load beam 600 includes a sheet material 601 having a first surface 610, a second surface 612, and a void 614 (formed, e.g., by etching) that extends through the sheet material between the first surface and the second surface. The stiffening member 602 is formed from a material 640 molded upon the sheet material 601. In this case the stiffening member 602 includes a first portion 620 formed on the first surface 610 of the sheet material and a second portion 622 formed on the second surface 612 of the sheet material. The first and second portions 620, 622 are joined together through the void 614. A third portion 624 is formed as a rib about an edge 608 of the sheet material 601, and is joined to the second portion 622. The stiffening member 602 includes a fourth portion 626, which is formed as a rib upon the second surface 612 of the sheet material, joined at the void 614 with the first and the second portions 620, 622. In this case, the different portions of the stiffening member 602 generate a combined stiffening effect that creates an enhanced part stiffness factor along and in the direction of the edge 608 of the sheet material. For example, the rib 624 provides encasement of the edge 608 of the material sheet 601, while the fourth portion 626 provides a parallel rib on the second surface 612, spaced apart from the edge 608. The joining of the multiple portions through the void 614 also secures the stiffening member 602 to the sheet material 601 in some embodiments.

As illustrated in FIGS. 6A-6C, the targeted application of the stiffening effect is illustrated by the stiffening member 602 having a contained footprint upon the sheet material 601. For example, the rib 624 is formed on the first surface 610 of the sheet material and at least a portion 630 of the first surface 610 of the sheet material adjacent the rib 624 is free from the molded material 640, which extends to the one edge 608 of the sheet material 601. At least a portion 632 of the second surface 612 of the sheet material adjacent the second portion 622 of the stiffening member is also free from the molded material 640. Further, the second surface 612 to the sides of the rib 626 is free from the molded material 640, as well as the portion of the first surface 610 surrounding the first portion 620 of the stiffening member 602.

Figure 7A:
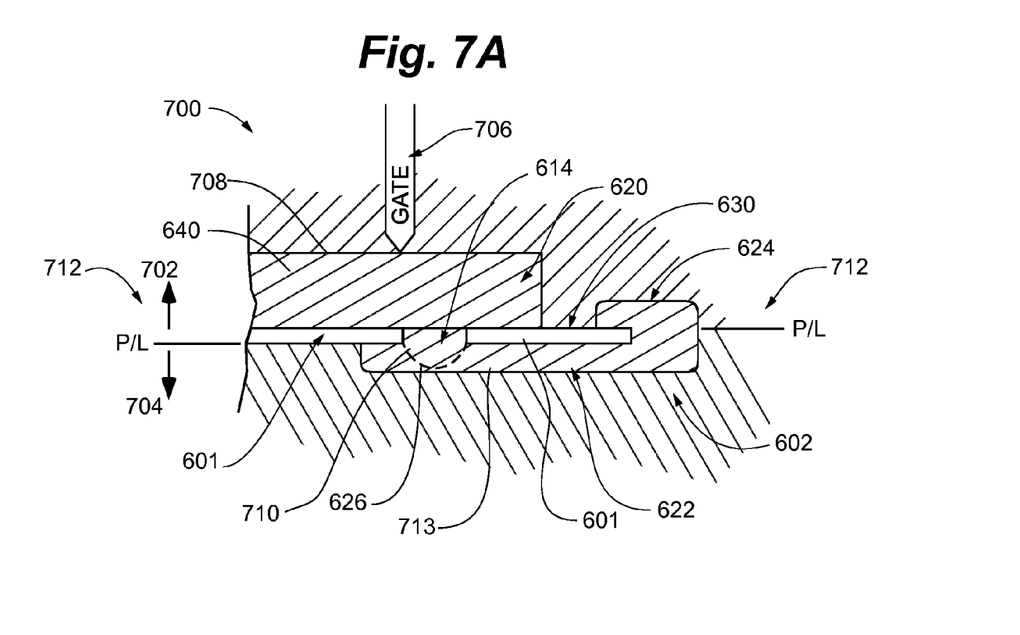
FIG. 7A is a partial cross-sectional view of a mold injected with a moldable material for forming the stiffening member of FIGS. 6A-6C on a sheet material in accordance with an embodiment of the invention.
Figure 7B:
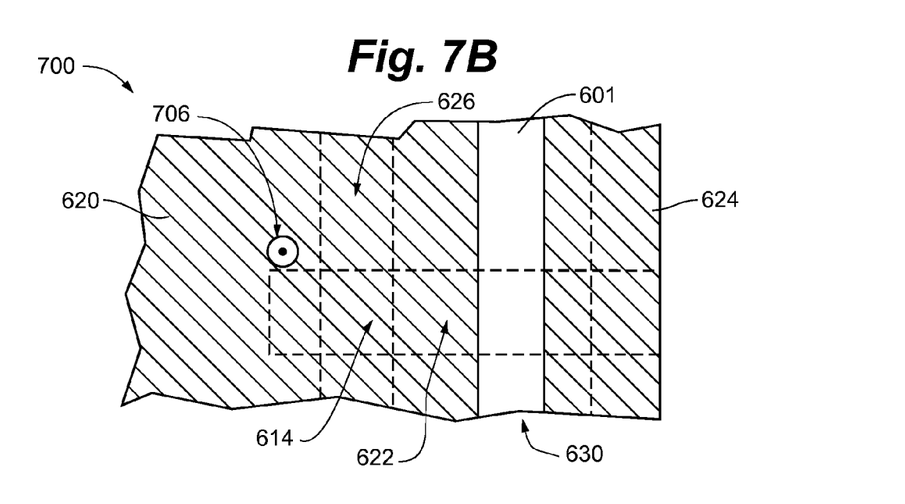
FIG. 7B is a partial top view of the mold of FIG. 7A with a moldable material injected in accordance with an embodiment of the invention.

FIGS. 7A and 7B are a partial cross-sectional and top views of a mold 700 injected with the moldable material 640 for forming the stiffening member of FIGS. 6A-6C on a sheet material 601 in accordance with an embodiment of the invention. The mold 700 includes a first side 702 and a second side 704 that meet at a parting line 712, and a material gate 706. The first side 702 defines a cavity 708 for forming the first portion 620 of the stiffening member, while the second side 704 defines mold cavities 710, 713 for forming the fourth portion rib 626 and the second portion 622 of the stiffening member 602. Both the first and the second sides include cavities for forming the rib 624 about the edge 608 of the sheet material. The mold 700 thus forms specific portions of the stiffening member through polymer flow-through and/or polymer wrap-around encasement of portions of the sheet material 601. This method advantageously allows for the creation of multi-part stiffening members upon a sheet material (e.g., stainless steel or another metal sheet) to enhance directional stiffness in multiple directions without the need to completely encase the entire sheet material 601.

Figure 8A:
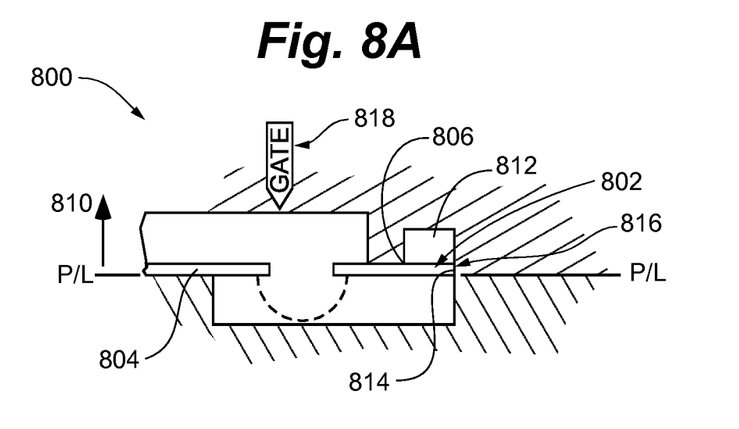
FIG. 8A is a partial cross-sectional view of a mold for forming a stiffening member on a sheet material in accordance with an embodiment of the invention.
Figure 8B:
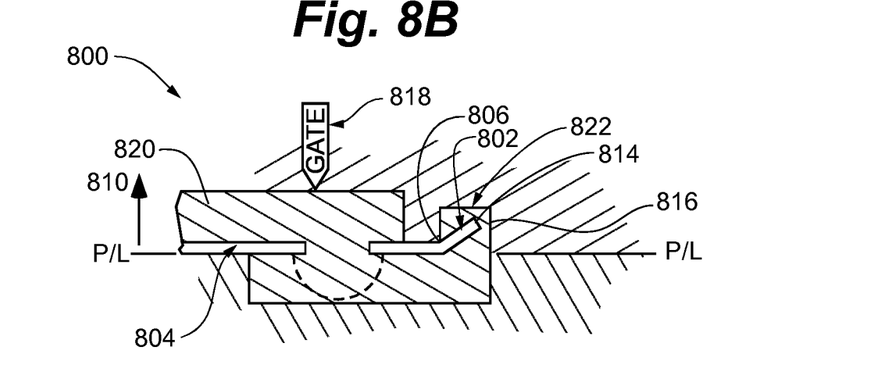
FIG. 8B is a partial cross-sectional view of the mold of FIG. 8A with a moldable material injected in accordance with an embodiment of the invention.

According to some embodiments of the invention, a novel method of forming load beams with one or more out-of-plane portions is provided as part of an injection molding process. FIG. 8A is a partial cross-sectional view of a mold 800 for forming a stiffening member similar in many respects to the stiffening member 602 illustrated in FIGS. 6A-7B. FIG. 8B is a partial cross-sectional view of the mold 800 of FIG. 8A with a moldable material 820 injected in accordance with an embodiment of the invention. According to some embodiments, a force generated by the injected material (e.g., polymeric material) is used to bend a portion 802 of a sheet material 804 about a counterpoint 806 in the mold 800. For example, the mold 800 includes a first side 810 defining a cavity 812, against which the sheet portion 802 to be bent is positioned. The mold 800 is preferably configured to very closely position an edge 814 of the sheet material next to the mold wall 816, thus blocking material access to the cavity 812. A polymeric or other moldable material 820 is then injected through a gate 818 at extremely high pressure (e.g., 10,000 PSI). As the injected material 820 flows through the cavities and passages in the mold 800, the material encounters the portion 802 of the sheet material blocking access to the cavity 812. The elevated pressure of the injection process can cause the material flow to bend the portion 802 of the sheet material away from the mold wall 816. As the portion 802 bends, the material 820 backfills behind the portion 802, equalizing the pressure about the portion 802 of the sheet material and encasing it in the moldable material. Accordingly, the injection molding process can be utilized to form a load beam having an out-of-plane portion and a stiffening member that includes a rib 822 formed about the out-of-plane portion to create an enhanced stiffening effect. The same technique can be used to form other types of out-of-plane portions in addition to edge portions as illustrated in FIGS. 8A-8B. For example, the method could potentially be used to create a rib about an out-of-plane portion located within a perimeter of the sheet material.

Figure 9A:
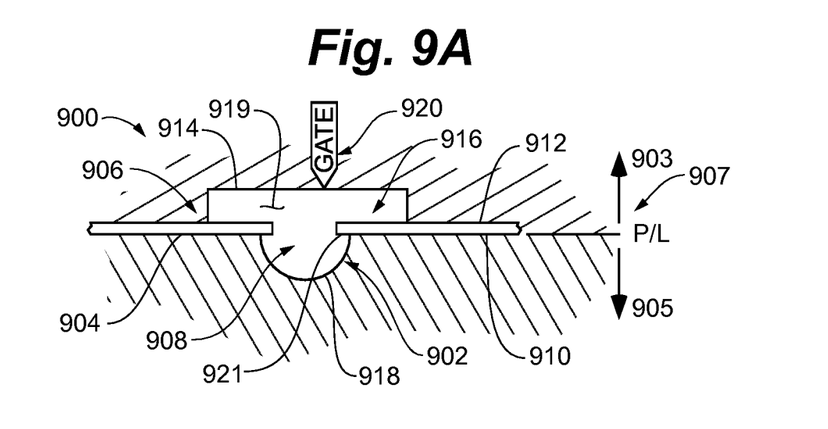
FIG. 9A is a partial cross-sectional view of a mold for forming a load bearing dimple on a sheet material in accordance with an embodiment of the invention.

FIG. 9A is a partial cross-sectional view of a mold 900 for forming a load bearing dimple 902 on a sheet material 904 in accordance with an embodiment of the invention. According to some embodiments of the invention, injection mold techniques can be used to create the load bearing dimple 902 on the sheet material (e.g., a metal sheet such as stainless steel) of a load beam 906. The mold 900 includes a first side 903 and a second side 905 that meet at a mold parting line 907. The sheet material 904 can be provided with a void 908 extending through the sheet between a first surface 910 and a second surface 912 of the sheet material 904. The first mold side 903 includes a cavity 914 for forming a dimple attachment member 916 on the second surface 912 of the sheet material. The second mold side 905 includes a cavity 918 for forming the load bearing dimple 902. In certain embodiments the dimple cavity 918 is wider than the void 908 to provide a locking mechanism that secures the dimple and the attachment member to the sheet material proximate 921 the void 908. During the molding process, a moldable polymeric material 919 is injected through a gate 920 into the mold cavities to form the load dimple 902 and dimple attachment member 916. In certain embodiments the polymeric material 919 has a high melt temperature and is highly lubristic. In some cases the material 919 includes polytetrafluoroethylene (PTFE) or another similar polymer.

Figure 9B:
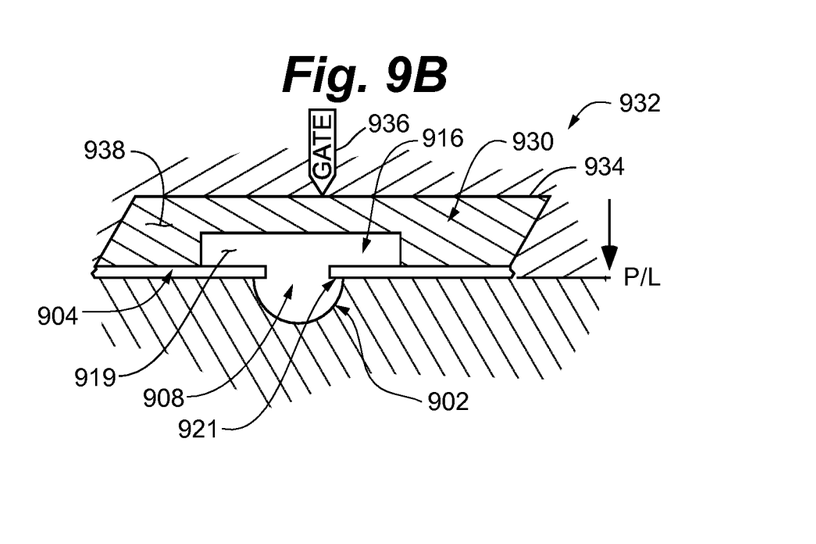
FIG. 9B is a partial cross-sectional view of a mold for forming a stiffening member over the load bearing dimple of FIG. 9A in accordance with an embodiment of the invention.

According to some embodiments a two-step injection molding process can be used to first create the load bearing dimple 902 as in FIG. 9A, and then form a stiffening member over the load bearing dimple attachment member. For example, a two-step process illustrated by the combination of steps shown in FIGS. 9A and 9B can be used to create a composite structure upon the material sheet 904 during a continuous and sequential assembly process. FIG. 9B is a partial cross-sectional view of another mold 932 for forming the stiffening member 930 over the load bearing dimple attachment member 916 in accordance with an embodiment of the invention. The mold 932 includes a cavity 934 for forming the stiffening member 930 and a gate 936 allowing injection of a moldable material 938. The material 938 can comprise any suitable moldable material. In certain embodiments the material 938 is a polymeric material suitable for injection molding. In some cases the material 938 for the stiffening portion 930 may be different from the material used to form the load bearing dimple 902. For example, in some cases a polymeric material with a lower melt temperature than the dimple material 919 may be used. It should also be appreciated that the stiffening member 930 can be formed in a number of different shapes and dimensions, some of which are described above.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A load beam for a head suspension assembly within a digital data disk drive, the load beam comprising:
    a sheet material adapted to extend between an actuator mounting portion of the head suspension assembly and a flexure mounting section of the head suspension assembly, the sheet material comprising a first surface, a second surface, and an out-of-plane portion extending out from the first surface of the sheet material at a nonzero angle; and
    a stiffening member comprising a rib formed on the sheet material about the out-of-plane portion, the stiffening member comprising a molded material formed on the sheet material with a mold,
    the out-of-plane portion of the sheet material being formed according to at least one respective counterpoint of the mold.

2. The load beam of claim 1, wherein the rib is formed on the first surface of the sheet material and wherein a portion of the first surface of the sheet material surrounds the rib and is free from the molded material.

3. The load beam of claim 1, wherein the rib is formed on the first surface of the sheet material and comprises a first portion of the stiffening member, and the stiffening member further comprises a second portion formed on the second surface of the sheet material.

4. The load beam of claim 3, wherein at least a portion of the first surface of the sheet material adjacent the rib is free from the molded material and at least a portion of the second surface of the sheet material adjacent the second portion of the stiffening member is free from the molded material.

5. The load beam of claim 3, wherein the sheet material defines a void and the first portion and the second portion of the stiffening member are joined through the void.

6. The load beam of claim 1, wherein the rib encases the out-of-plane portion.

7. The load beam of claim 6, wherein the rib comprises a domed cross-sectional profile.

8. The load beam of claim 1, wherein the out-of-plane portion comprises a first out-of-plane portion, the sheet material comprises a second out-of-plane portion, and the rib of the stiffening member is formed about each of the first and the second out-of-plane portions.

9. The load beam of claim 1, further comprising a plurality of stiffening members, wherein the sheet material comprises a plurality of the out-of-plane portions and each of the plurality of stiffening members comprises a rib formed on the sheet material about at least one of the plurality of the out-of-plane portions.

10. The load beam of claim 1, wherein the sheet material comprises a perimeter and the out-of-plane portion comprises a partially separated section of the sheet material bent out-of-plane to form a void in the sheet material within the perimeter of the sheet material.

11. The load beam of claim 1, wherein the out-of-plane portion comprises an edge of the sheet material.

12. The load beam of claim 1, wherein the sheet material further comprises an integral actuator mounting portion and an integral flexure mounting section.

13. A load beam for a head suspension assembly within a digital data disk drive, the load beam comprising:
a sheet material adapted to extend between an actuator mounting portion of the head suspension assembly and a flexure mounting section of the head suspension assembly, the sheet material comprising a first surface, a second surface, and a void extending through the sheet material between the first surface and the second surface; and
a stiffening member comprising a first portion formed on the first surface of the sheet material, a second portion formed on the second surface of the sheet material and being joined to the first portion through the void, and a third portion joined to the second portion and comprising a rib formed about an edge of the sheet material, each of the first, second, and third portions of the stiffening member comprising a molded material formed on the sheet material with a mold,
the void extending through the sheet material being formed according to at least one respective counterpoint of the mold.

14. The load beam of claim 13, wherein a portion of the first surface of the sheet material separates the first portion of the stiffening member from the third portion of the stiffening member.

15. The load beam of claim 13, wherein at least a portion of the second surface of the sheet material adjacent the second portion of the stiffening member is free from the molded material.

16. The load beam of claim 15, wherein the second portion of the stiffening member comprises a longitudinal beam of the molded material extending from the void in the sheet material to the edge of the sheet material and the third portion of the stiffening member.

17. The load beam of claim 13, wherein the edge of the sheet material is bent at a nonzero angle with respect to the first surface of the sheet material.

18. A load beam for a head suspension assembly within a digital data disk drive, the load beam comprising:
a metal sheet adapted to extend from an actuator mounting portion of the head suspension assembly, the metal sheet comprising a first surface, a second surface, and a void extending through the metal sheet between the first surface and the second surface;
a load bearing dimple formed from a molded polymeric material on the first surface of the metal sheet proximate the void; and
a dimple attachment member formed from the molded polymeric material on the second surface of the metal sheet and joined to the load bearing dimple through the void.

19. The load beam of claim 18, further comprising a stiffening member formed on the second surface of the metal sheet about the dimple attachment member, the stiffening member comprising a molded material.

20. The load beam of claim 19, wherein the molded polymeric material forming the load bearing dimple and the dimple attachment member has a higher melt temperature than the molded material forming the stiffening member.

21. The load beam of claim 19, wherein the molded polymeric material forming the load bearing dimple and the dimple attachment member comprises polytetrafluoroethylene and the molded material forming the stiffening member comprises a polymeric material.

22. A method for making a load beam for a head suspension assembly within a digital data disk drive, the method comprising:
providing a sheet material adapted to extend between an actuator mounting portion of the head suspension assembly and a flexure mounting section of the head suspension assembly, the sheet material comprising a first surface and a second surface;
placing the sheet material within a mold;
bending a portion of the sheet material out-of-plane with respect to the first surface of the sheet material after placing the sheet material within the mold; and
injecting a polymeric material into the mold to form a stiffening member comprising a rib formed on the sheet material about the out-of-plane portion of the sheet material.

23. The method of claim 22, further comprising bending the portion of the sheet material out-of-plane by advancing at least one push bar against the sheet material.

24. The method of claim 23, further comprising advancing the at least one push bar as a first side of the mold and a second side of the mold are closed upon the sheet material.

25. The method of claim 22, further comprising bending the portion of the sheet material out-of-plane with a force generated by the injected polymeric material.

26. The method of claim 22, wherein the out-of-plane portion comprises a first out-of-plane portion, and further comprising bending a second portion of the sheet material out-of-plane with respect to the first surface of the sheet material after placing the sheet material within the mold, wherein the rib is formed on the sheet material about both the first and the second out-of-plane portions of the sheet material.

27. The method of claim 22, further comprising bending a plurality of portions of the sheet material out-of-plane with respect to the first surface of the sheet material after placing the sheet material within the mold and forming a plurality of the stiffening members each comprising a rib formed on the sheet material about at least one of the plurality of the out-of-plane portions.

28. The method of claim 23, further comprising advancing the at least one push bar relative to the mold.

* * * * *